(No Model.) 2 Sheets—Sheet 1.
J. BENNOR.
TRAP.
No. 272,020. Patented Feb. 13, 1883.
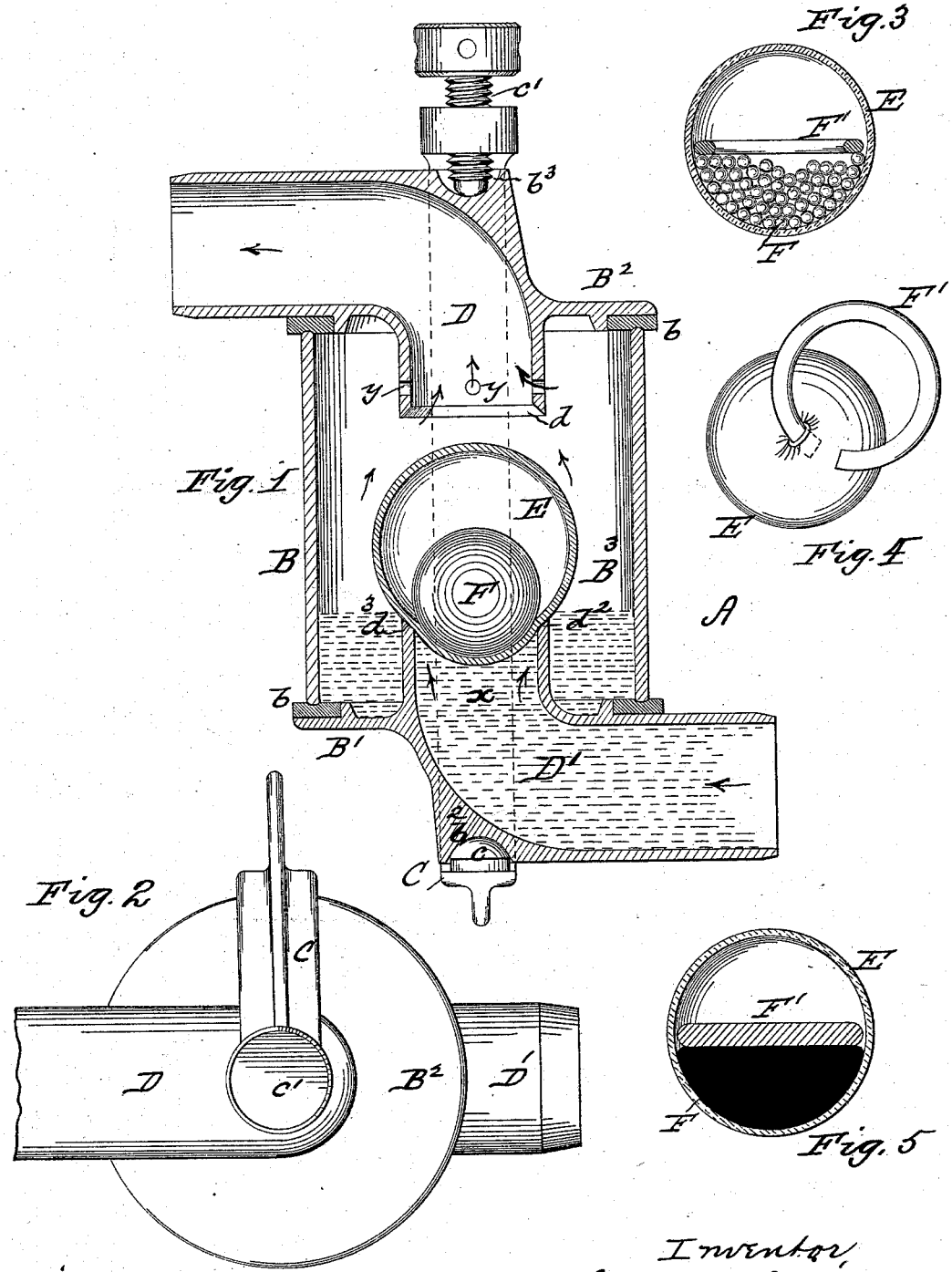
Witnesses:
C. Ebbih
F. Fish
Inventor,
Joseph Bennor
By S. J. VanStavoren
Attorney

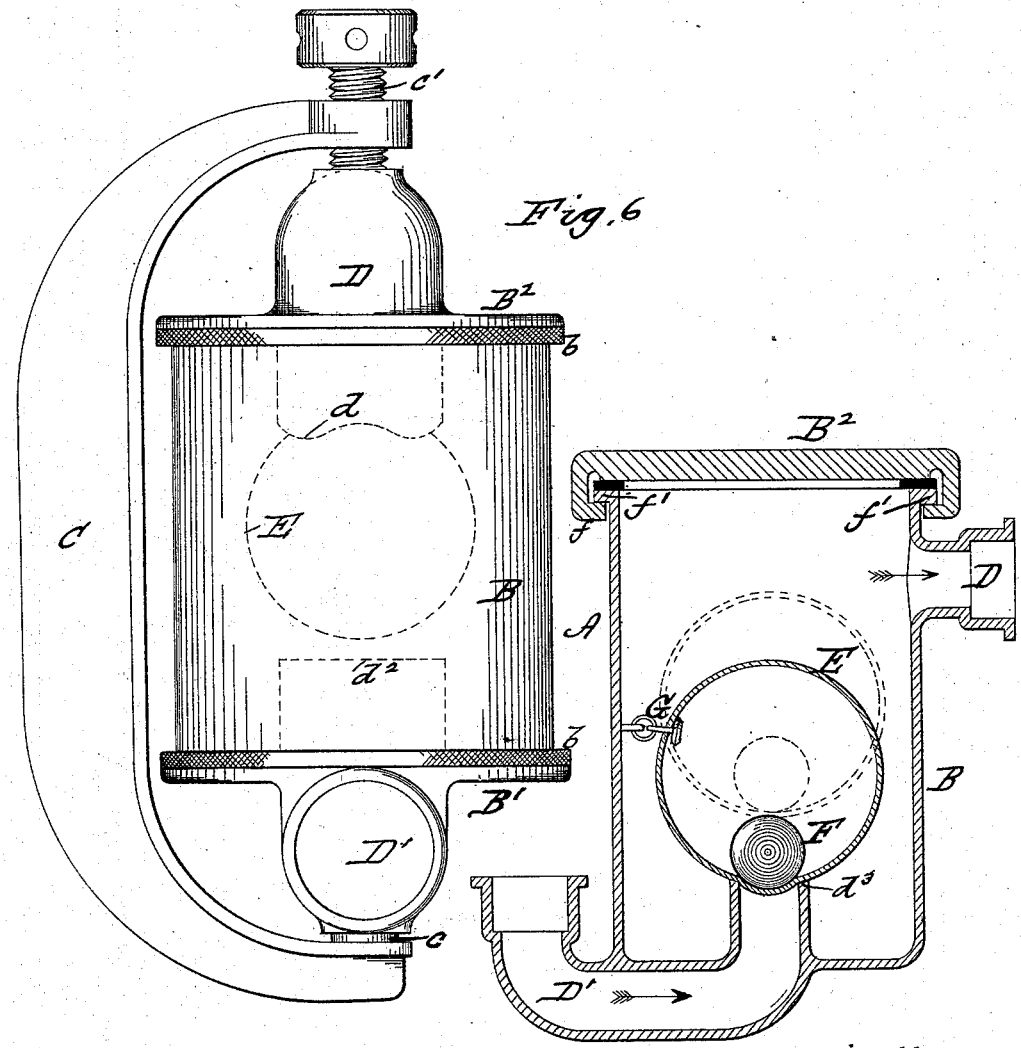

UNITED STATES PATENT OFFICE.

JOSEPH BENNOR, OF PHILADELPHIA, PENNSYLVANIA.

TRAP.

SPECIFICATION forming part of Letters Patent No. 272,020, dated February 13, 1883.

Application filed June 8, 1882. (No model.)

*To all whom it may concern:*

Be it known that I, JOSEPH BENNOR, a citizen of the United States, residing at Philadelphia, in the county of Philadelphia and State of Pennsylvania, have invented certain new and useful Improvements in Traps for Wash-Basins, &c., of which the following is a specification, reference being had therein to the accompanying drawings, wherein—

Figure 1 is a vertical longitudinal section of a trap embodying my invention. Fig. 2 is a plan of the same. Figs. 3 and 5 represent sectional views of the elastic valve, with modified form of weight or load therefor. Fig. 4 is a plan illustrating the manner of inserting a split washer in the elastic valve. Fig. 6 is an elevation of the trap, and Fig. 7 is a vertical section of a modified construction of same.

My invention has relation to traps for bath-tubs, lavatories, &c., and has for its object to provide a trap the parts of which are simple in construction and can be readily put together and disconnected, and the trap be expeditiously connected to the waste-pipes of wash-basins, &c., without changing the size or the location of said pipes.

My invention accordingly consists of a trap comprising a chamber having eduction and induction pipes, and an elastic ball or valve suitably weighted or provided with a load which is of a size that it prevents the valve being forced into the seat or pipe intended to be sealed thereby, said valve being designed and adapted to descend by gravity to seal the outlet of the induction-pipe, and is raised therefrom to unseal said outlet by hydrostatic pressure in the induction-pipe.

Referring to the accompanying drawings, A represents a trap composed of a glass or metal body, B, bottom B', and top B², with interposed gaskets or packing-rings $b$ $b$ to form air-tight joints between said parts.

C represents a yoke having a stud, $c$, at one end and a screw, $c'$, at its opposite end. Said stud and the end of the screw $c'$ enter openings $b^2$ $b^3$ in the bottom and top plates, B' B², respectively, so that by turning or adjusting screw $c'$ all of said parts are rigidly and securely held together in their due and relative position. By disconnecting the yoke C the parts of the trap may be readily taken apart for cleansing purposes. The top plate, B², is provided with an eduction-pipe, D, the edge $d$ of which may be beveled off, as shown in Fig. 1. The bottom plate, B', is formed or provided with an induction-pipe, D'. The edge of its outlet $d^2$ is suitably beveled or turned off to form a seat, $d^3$, for an elastic ball or valve, E, which rests thereon to seal said outlet. The valve E is designed to be made of soft rubber, in order that it may possess extreme elasticity, so that when in position on seat $d^3$ contact will be made therewith throughout the entire area of said seat to form a perfect seal therefor. The formation of such seal between valve E and seat $d^3$ is further assured by the employment of a weight or load, F, placed within said valve. Such weight may consist of a metal ball, as shown in Figs. 1 and 7; or mercury, shot, or other suitable material may be employed. When mercury or shot is used a metal washer, ring, or disk, F', is also placed within valve E upon the top of the mercury or shot, as shown in Figs. 3 and 5. The diameters of said ball F or washer or disk F' are greater than the bore of the induction-pipe, so as to prevent valve E being forced into said pipe by back-pressure. The load or weight F not only stretches or elongates the valve E to cause it to form a more perfect seal for opening $d^2$, but also causes said valve to automatically return to seat $d^3$ when raised therefrom by hydrostatic pressure of a column of water flowing into the induction-pipe from the waste-pipe of a wash-basin, &c. When valve E is so lifted the opening $d^2$ is unsealed and water from such fixture passes through the trap, as indicated by the arrows. After the passage of the water, if the trap be not siphoned, a part of such fluid remains in the chamber B³ and in the induction-pipe; but the weight F is of such gravity that valve E descends through the water and seals the opening $d^2$ of the induction-pipe. Any back-pressure causes valve E to effect a tighter seal for opening $d^2$, while the ball F or washers F' in said valve prevent it being forced into the induction-pipe. When valve E is raised from seat $d^3$ it may ascend until it strikes against end $d$ of pipe D. To prevent the valve being retained in such position by suction in the eduction-pipe D, and thereby stop the flow of water through the trap, openings $y$ may be formed in said pipe, as shown in Fig. 1; or its lower edge, $d$, may be irregular in outline, as shown in Fig. 6. The ball F or disk F' is placed within the valve E in the act of molding the latter, while shot and mercury are passed into the ball through the usual small opening formed therein. The ring or washer designed to be placed upon the top of such mercury or shot is also passed through said opening, being first split or cut away, however, to admit of such operation. The split washer and the manner of inserting it into valve E are plainly illustrated in Fig. 4.

In Fig. 7 I have shown a modification of my invention wherein the body B has a lateral eduction opening or pipe, D. The top plate, B², is secured to said body by means of flanges f and inclined lugs f', and the valve E is attached to body B by a link and button or chain, G.

I have shown and described the loaded elastic valve in connection with traps for wash-basins, &c.; but it is evident that the same may be advantageously employed in hydraulic rams and other like devices where the operating power or pressure is normal and not of sufficient force to cause a rapid wear of the valve E.

The size of body B and that of the valve E are so proportioned that the latter will always return to the outlet of the induction-pipe after being elevated therefrom.

What I claim is—

1. A trap having an eduction and an induction pipe, and an elastic valve carrying a weight or load suitably arranged to prevent the valve being forced into the induction-pipe, and operating by gravity to seal the outlet of the induction-pipe, and rising therefrom to unseal said outlet by the pressure of a column of water or other fluid in said pipe, substantially as shown and described.

2. A valve for stench-traps, &c., composed of a rubber ball, E, having an inclosed loose metal ball, F, the diameter of which is less than that of ball E, and yet is of such extent that it prevents the ball E being forced through its seat or into the pipe sealed thereby, substantially as shown and described.

3. In combination with body B, having top and bottom plates with interposed gaskets or packing-rings, a yoke, C, constructed and arranged to hold said parts together, substantially as shown and described.

4. The combination, with body B, top and bottom plates, B' B², and eduction and induction pipes D D', of a valve, E, loaded at F, substantially as shown and described.

5. The combination, with body B, top and bottom plates, B' B², and eduction and induction pipes D D', of a valve, E, loaded at F, and connecting-yoke C, substantially as shown and described.

In testimony whereof I affix my signature in presence of two witnesses.

JOSEPH BENNOR.

Witnesses:
CHAS. F. VAN HORN,
S. J. VAN STAVOREN.